(12) United States Patent
Hakamata et al.

(10) Patent No.: US 12,305,810 B2
(45) Date of Patent: May 20, 2025

(54) PRESSURE VESSEL LINER AND METHOD FOR MANUFACTURING PRESSURE VESSEL LINER

(71) Applicant: YACHIYO INDUSTRY CO., LTD., Saitama (JP)

(72) Inventors: Yasuyuki Hakamata, Saitama (JP); Ken Kamiya, Saitama (JP); Junya Yoshioka, Saitama (JP); Akihiro Yashima, Saitama (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 18/568,098

(22) PCT Filed: May 31, 2022

(86) PCT No.: PCT/JP2022/022055
§ 371 (c)(1),
(2) Date: Dec. 7, 2023

(87) PCT Pub. No.: WO2022/259906
PCT Pub. Date: Dec. 15, 2022

(65) Prior Publication Data
US 2024/0263741 A1    Aug. 8, 2024

(30) Foreign Application Priority Data
Jun. 9, 2021    (JP) .................................. 2021-096316

(51) Int. Cl.
*F17C 1/16*        (2006.01)
*B29C 45/00*    (2006.01)
(Continued)

(52) U.S. Cl.
CPC .............. *F17C 1/16* (2013.01); *B29C 45/006* (2013.01); *B29C 45/14622* (2013.01);
(Continued)

(58) Field of Classification Search
CPC ................ F17C 1/16; F17C 2201/0109; F17C 2203/013; F17C 2203/0604;
(Continued)

(56) References Cited

U.S. PATENT DOCUMENTS

| 4,394,929 A | 7/1983 | Patel et al. | |
| 2002/0088806 A1* | 7/2002 | Takaku | F17C 1/16 220/589 |

(Continued)

FOREIGN PATENT DOCUMENTS

| CN | 113733450 A | * 12/2021 | |
| EP | 2023032 A1 | * 2/2009 | ................ F17C 1/16 |

(Continued)

OTHER PUBLICATIONS

Written Opinion dated on Aug. 16, 2022 and the International Preliminary Report dated Mar. 14, 2023 for PCT/JP2022/022055.

(Continued)

*Primary Examiner* — J. Gregory Pickett
*Assistant Examiner* — Niki M Eloshway
(74) *Attorney, Agent, or Firm* — KENEALY VAIDYA LLP

(57) ABSTRACT

A fuel tank including a built-in component is provided. The built-in component includes: a carrier part being a rigid body including a plurality of engaging parts, and a plurality of struts each including an engageable part to be engaged with one of the engaging parts. The engageable part of the strut includes an upper contact surface and a lower contact surface, which are formed spaced apart from each other in a height direction. The engaging parts of the carrier part each includes a biasing part that, when the strut is engaged with the engaging part, enters a space between the upper contact surface and the lower contact surface and generates biasing (Continued)

forces in directions to move the upper contact surface and the lower contact surface away from each other.

4 Claims, 7 Drawing Sheets

(51) Int. Cl.
*B29C 45/14* (2006.01)
*B29L 31/00* (2006.01)
(52) U.S. Cl.
CPC .............. *B29L 2031/7156* (2013.01); *F17C 2201/0109* (2013.01); *F17C 2203/013* (2013.01); *F17C 2203/0604* (2013.01); *F17C 2203/0619* (2013.01); *F17C 2203/066* (2013.01); *F17C 2209/2109* (2013.01); *F17C 2209/222* (2013.01); *F17C 2209/232* (2013.01)
(58) Field of Classification Search
CPC ....... F17C 2203/0619; F17C 2203/066; B29C 45/006; B29C 45/14622
USPC .......................................................... 220/581
See application file for complete search history.

(56) References Cited

U.S. PATENT DOCUMENTS

| | | | |
|---|---|---|---|
| 2014/0312043 | A1 | 10/2014 | Sejima et al. |
| 2021/0041064 | A1 * | 2/2021 | Zhao ......................... F17C 1/16 |

FOREIGN PATENT DOCUMENTS

| | | | | |
|---|---|---|---|---|
| JP | 2006-242247 | A | 9/2006 | |
| JP | 2008-161247 | A | 7/2008 | |
| JP | 2011-027161 | A | 2/2011 | |
| JP | 2014-224602 | A | 12/2014 | |
| JP | 2016-183709 | A | 10/2016 | |
| WO | WO-2006093059 | A1 * | 9/2006 | ......... B29C 65/1435 |
| WO | WO-2009053374 | A1 * | 4/2009 | ............... F17C 1/02 |
| WO | WO-2013026140 | A1 * | 2/2013 | ............ B60P 3/2205 |

OTHER PUBLICATIONS

The International Preliminary Report dated Feb. 6, 2023 for PCT/JP2022/022055.

* cited by examiner

PRESSURE VESSEL LINER AND METHOD FOR MANUFACTURING PRESSURE VESSEL LINER

CROSS-REFERENCE TO RELATED APPLICATION

This application is a U.S. National Stage Application under 35 U.S.C § 371 of International Patent Application No. PCT/JP2022/022055 filed on May 31, 2022, which claims the benefit of priority to Japanese Patent Application No. 2021-096316 filed on Jun. 9, 2021, the disclosures of all of which are hereby incorporated by reference in their entireties.

TECHNICAL FIELD

The present invention relates to a pressure vessel liner and a method for manufacturing the pressure vessel liner.

BACKGROUND ART

Patent Literature 1, for example, discloses a pressure vessel liner made of resin and arranged inside a pressure vessel. The pressure vessel liner according to Patent Document 1 has a pair of first liner members, in a bottomed cylindrical shape, joined with a second liner member in a bottomless cylindrical shape. Having the second liner member, in a bottomless cylindrical shape, interposed between the pair of first liner members allows for increasing the pressure vessel in size. The second liner member is molded such as by injection molding.

PRIOR ART DOCUMENT

Patent Document

Patent Document 1: Japanese Patent Application Publication No. 2006-242247

SUMMARY OF THE INVENTION

Problems to be Solved

Having a gate, through which molten resin is injected, axially off the center of a cavity, poses a risk that the second liner member, when molded, may have molding accuracy degraded at both ends in an axial direction thereof. That is, holding pressure in injection molding may not be even due to different distances from the gate to said both ends, to have a risk that a plate thickness of the second liner member at one end is different from that at the other end. If the plate thickness of the second liner member at one end is different from that at the other end, the pressure vessel may have differences in surface level at one or more sections on a surface thereof, when the second liner member is joined with the first liner members. This poses a problem that stress concentrates on said one or more sections, to have strength of the pressure vessel liner decreased.

Additionally, the pressure vessel has a reinforcing layer made of fiber reinforced resin over the pressure vessel liner. The pressure vessel has a small amount of gas permeating outside from the pressure vessel liner, to have an external pressure P2 acting on the pressure vessel liner inward from outside (from between the pressure vessel liner and the reinforcing layer). Normally, the pressure vessel has an internal pressure P1 acting on the pressure vessel liner outward from inside, and the internal pressure P1 is greater than the external pressure P2, so that there is no particular problem. However, depending on the conditions, the internal pressure P1 may become smaller than the external pressure P2, to have a risk of suffering buckling such that the pressure vessel liner recesses inside from outside. A large pressure vessel is likely to suffer buckling that is formed with a second liner member interposed between a pair of first liner members.

In view of such problems, the present invention is intended to provide a pressure vessel liner, having increased strength, and a method for manufacturing the pressure vessel liner.

Solution to Problems

In order to solve the above-identified problems, the present invention provides a pressure vessel liner made of resin and having a pair of first liner members, in a bottomed cylindrical shape, joined with a second liner member in a bottomless cylindrical shape, wherein the second liner member has joint sections at both ends in an axial direction thereof and is joined to the pair of first liner members at the joint sections, and the second liner member has a wall thickness thereof gradually decreasing from a midsection in an axial direction thereof toward the joint sections. In addition, the present invention provides a method for manufacturing the pressure vessel liner, the method including: a molding step of molding a pair of first liner members, in a bottomed cylindrical shape, and a second liner member in a bottomless cylindrical shape; and a joining step of joining the pair of first liner members with the second liner member at both ends in an axial direction of the second liner member, wherein the second liner member is molded in the molding step, with a resin injected such that a wall thickness of a molded product gradually decreases from a center in the axial direction of a cavity in a molding die toward both ends in the axial direction of the cavity, wherein the cavity has a distance between walls gradually decreasing from the center towards said both ends and communicates with a gate, through which the resin is injected, at the center.

According to the present invention, the second liner member has a wall thickness thereof gradually decreasing from the midsection toward both ends in the axial direction thereof, to allow for uniforming holding pressure in injection molding at both ends thereof, to improve molding accuracy, at said both ends, of the second liner member. This allows for eliminating or reducing a difference in surface level (difference in diameter) at the joint sections between the first liner members and the second liner member, so that stress concentration is avoided at the joint sections, to have increased strength of the pressure vessel liner. In addition, degradation in quality is avoided due to a molded product being rubbed against the molding die when released, so that the molded product is easily released.

Further, the second liner member is preferably formed, circumferentially on an inner peripheral surface thereof, with a reinforcing rib at the midsection.

The present invention has the reinforcing rib, so that buckling is prevented.

Moreover, the reinforcing rib is preferably in a ring shape.

The present invention reinforces the pressure vessel liner evenly in the circumferential direction.

Advantageous Effects of the Invention

The pressure vessel liner and the method for manufacturing the pressure vessel liner according to the present invention increase strength of the pressure vessel liner.

DETAILED DESCRIPTION OF EMBODIMENTS

<<Pressure Vessel>>

Figure 1:
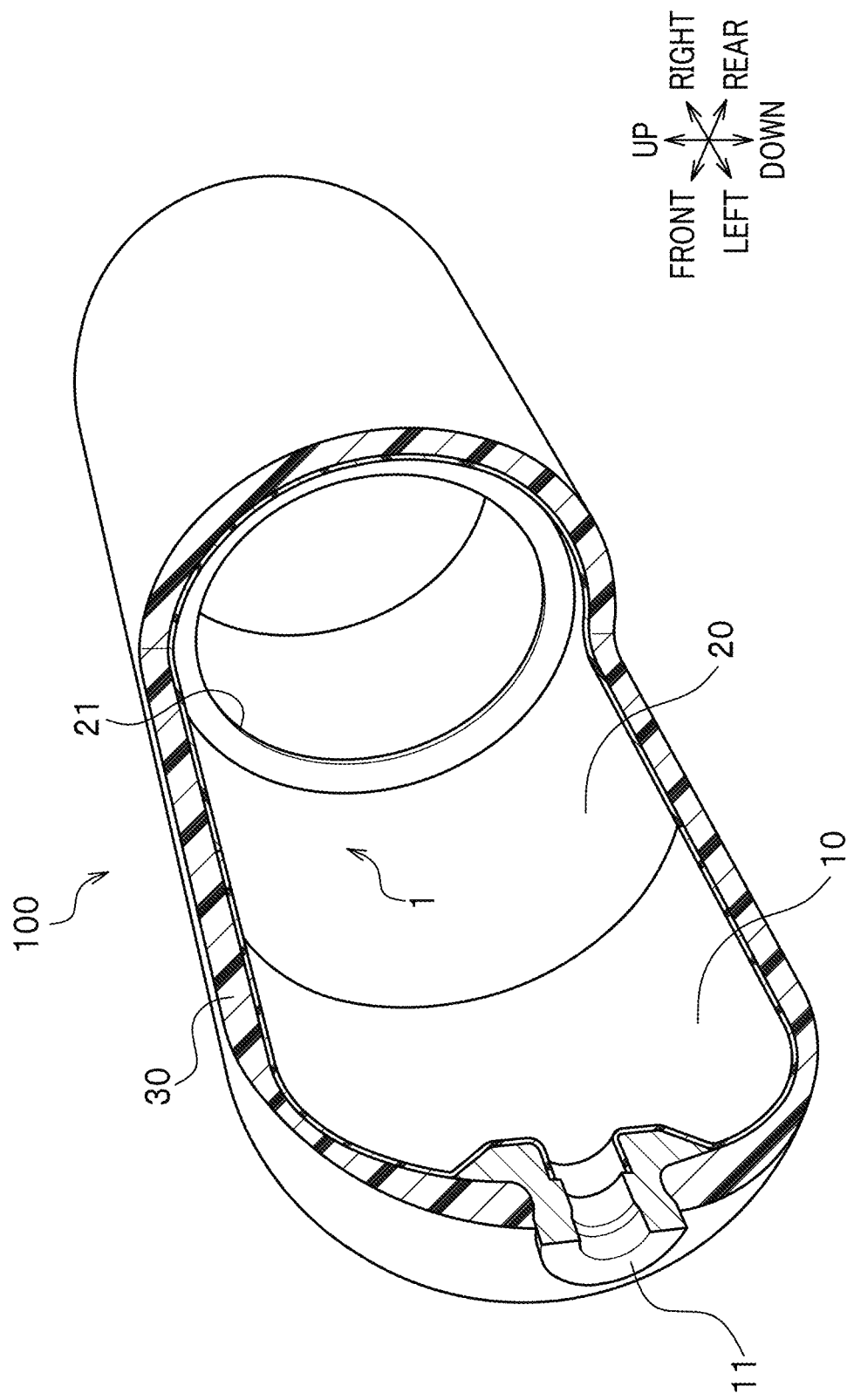
FIG. 1 is a perspective view of a pressure vessel liner according to the present embodiment.

Hereinafter, an embodiment of the present invention is described, with reference to the appended drawings. Note that the same components are denoted by the same reference numerals in the drawings, and duplicate descriptions thereof are skipped when not required. In the following description, "a front-rear direction," "a right-left direction," and "an up-down direction" are those as indicated by arrows in FIGS. 1 and 2.

Figure 2:
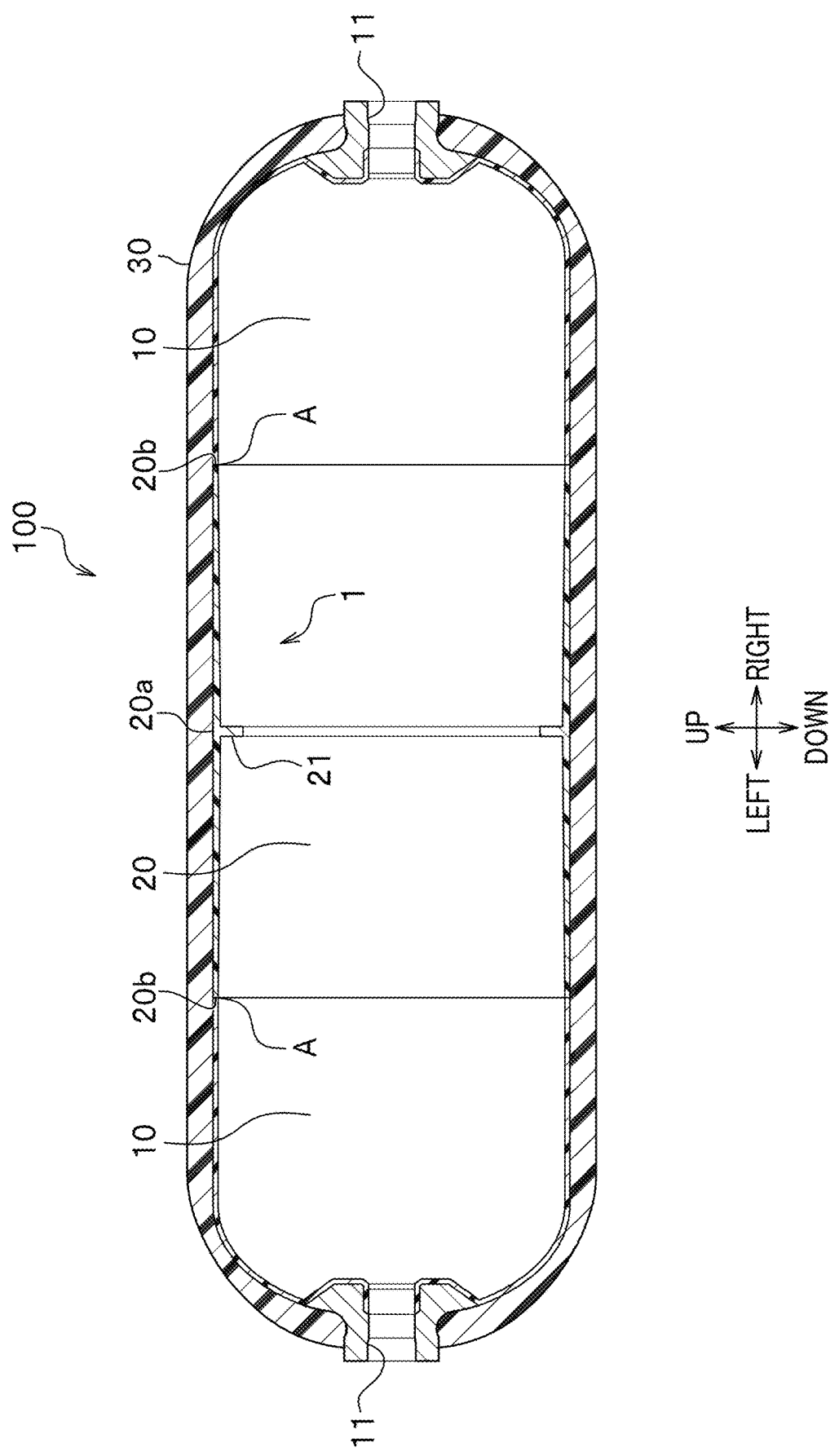
FIG. 2 is a sectional side view of the pressure vessel liner according to the present embodiment.

As shown in FIGS. 1 and 2, a pressure vessel 100 according to the present embodiment includes a hollow pressure vessel liner 1, fill necks 11, and a reinforcing layer 30. The pressure vessel 100 is a vessel to store therein gas such as hydrogen. The fill necks 11 are provided at both of right and left ends, through which gas is injected and discharged. The reinforcing layer 30 is provided over an outer periphery of the pressure vessel liner 1, to reinforce the pressure vessel liner 1. The reinforcing layer 30 is made of fiber-reinforced resin, for example.

The reinforcing layer 30 is formed by winding reinforcing fiber (not shown), impregnated with a thermosetting resin, around the pressure vessel liner 1 and curing the thermosetting resin. Glass fiber, carbon fiber, aramid fiber, or the like can be used as the reinforcing fiber of the reinforcing layer 30.

As shown in FIG. 2, the pressure vessel liner 1 includes first liner members 10, made of resin, and a second liner member 20 made of resin. The pressure vessel liner 1 is segmented into three parts in a longitudinal direction thereof (right-left direction in FIG. 1), with the first liner members 10 joined with the second liner member 20. The inside of the pressure vessel liner 1 serves as a storage space for storing gas.

<First Liner Member>

As shown in FIG. 1, the first liner member 10 has a dome shape and is provided, at a top thereof, with the fill neck 11. One end of the first liner member 10 is open and the other end narrows so as to be gradually reduced in diameter. That is, the first liner member 10 is formed in a bottomed cylindrical shape, with one end opening. Note that the first liner member 10 is not limited to one having a cylindrical shape as described above.

The fill neck 11 is made of metal such as stainless steel. The fill neck 11 has a part, such as a valve assembly, connected thereto at an opening thereof. The valve assembly communicates the storage space with an external gas flow path. The present embodiment has the fill necks 11 provided at both ends of the pressure vessel liner 1, but may have the fill neck 11 provided only at one end.

<Second Liner Member>

As shown in FIG. 2, the second liner member 20 is open at both ends in an axial direction thereof and has a cylindrical shape. The second liner member 20 is formed, circumferentially on an inner peripheral surface thereof, with a reinforcing rib 21 at around a midsection 20a in the axial direction thereof. The second liner member 20 has a shape substantially line-symmetric with respect to the reinforcing rib 21. The reinforcing rib 21 has a ring shape in the present embodiment. The reinforcing rib 21 is continuously formed in the circumferential direction, with a constant wall thickness and a constant overhang length.

The second liner member 20 has the wall thickness formed so as to be the thickest at around the midsection 20a and gradually become thinner toward both ends 20b in the axial direction thereof. The first liner members 10 and the second liner member 20 are joined to each other at joint sections A, with their ends facing each other. The joint sections A are circumferentially formed. A way of joining is not particularly limited, but the present embodiment uses welding for the joining.

<Method for Manufacturing Pressure Vessel Liner 1)

Next described is a method for manufacturing the pressure vessel liner. The method for manufacturing a pressure vessel liner according to the present embodiment includes a molding step and a joining step.

In the molding step, the first liner member 10 and the second liner member 20 are each molded by injection molding. The first liner member 10 is molded using a first-liner-member molding die (not shown).

Figure 3:
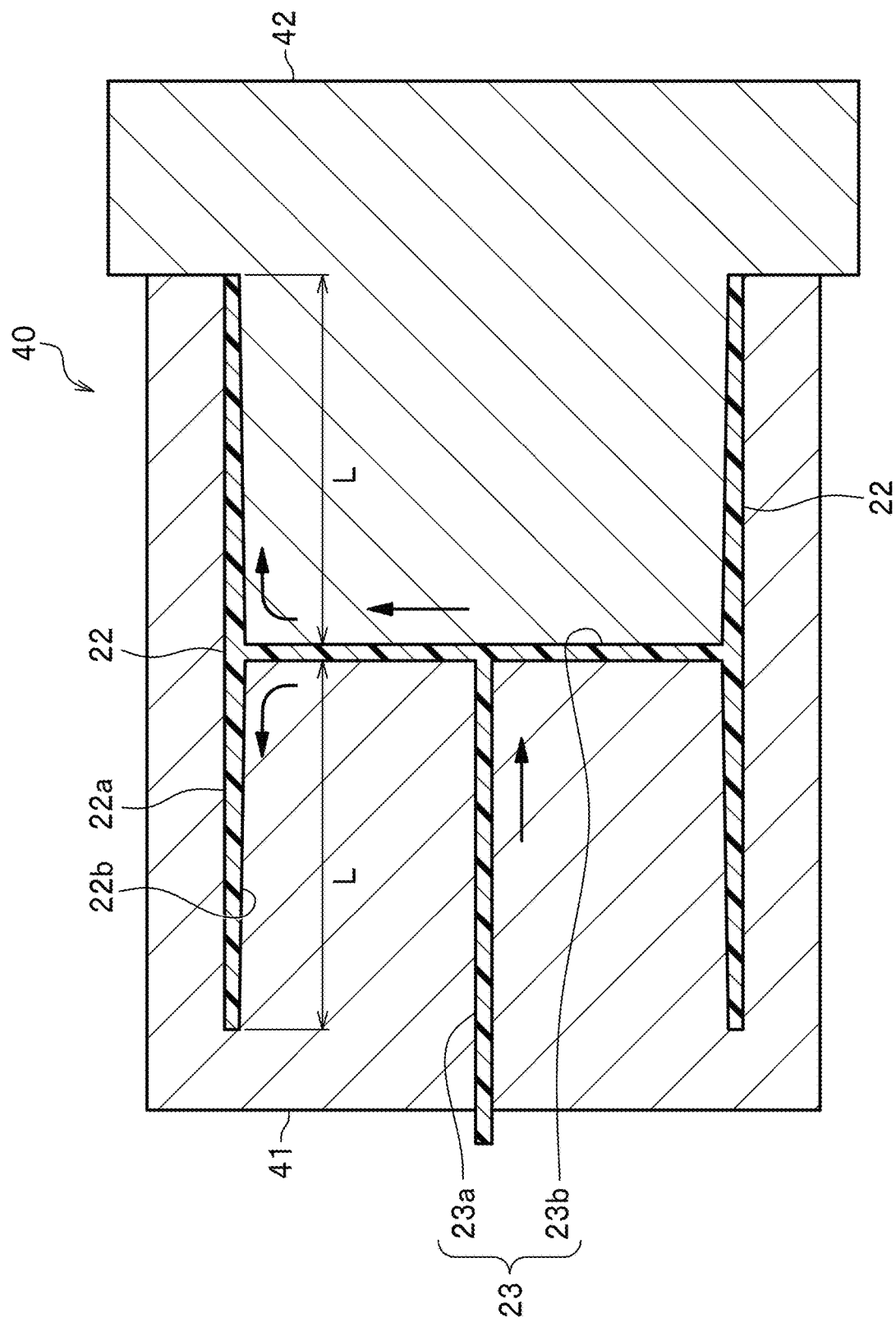
FIG. 3 is a cross-sectional side view of a scene in a molding step, to mold a second liner member of a method for manufacturing the pressure vessel liner according to the present embodiment.

As shown in FIG. 3, the second liner member 20 is molded using a second-liner-member molding die 40. The second-liner-member molding die 40 is composed of a first molding die 41, as a concave die, and a second molding die 42 as a convex die. The second molding die 42 is fitted into the first mold die 41, to define a cavity 22 and a gate 23.

The cavity 22 is a cylindrical space. Distances L from a center to both ends in the axial direction of the cavity 22 are equal to each other. The cavity 22 has a distance between walls (height of the space) gradually decreasing from the center toward both ends. More in detail, a diameter of an outer wall for the cavity 22 is constant in the axial direction. In contrast, a diameter of an inner wall for the cavity 22 gradually increases from the center toward both ends in the axial direction. That is, an inner peripheral surface 22b in the cavity 22 is inclined so as to be gradually closer to an outer peripheral surface 22a from the center toward both ends.

The gate 23 is where molten resin is injected into the cavity 22. The gate 23 includes a linear section 23a and a disk section 23b. The linear section 23a is a linear space. The disk section 23b is a disk-shaped space continuous to an end of the straight section 23a. The disk section 23b is perpendicular to the straight section 23a. Additionally, the disk section 23b communicates, at an outer peripheral edge thereof, with the cavity 22 at the center.

Figure 4:
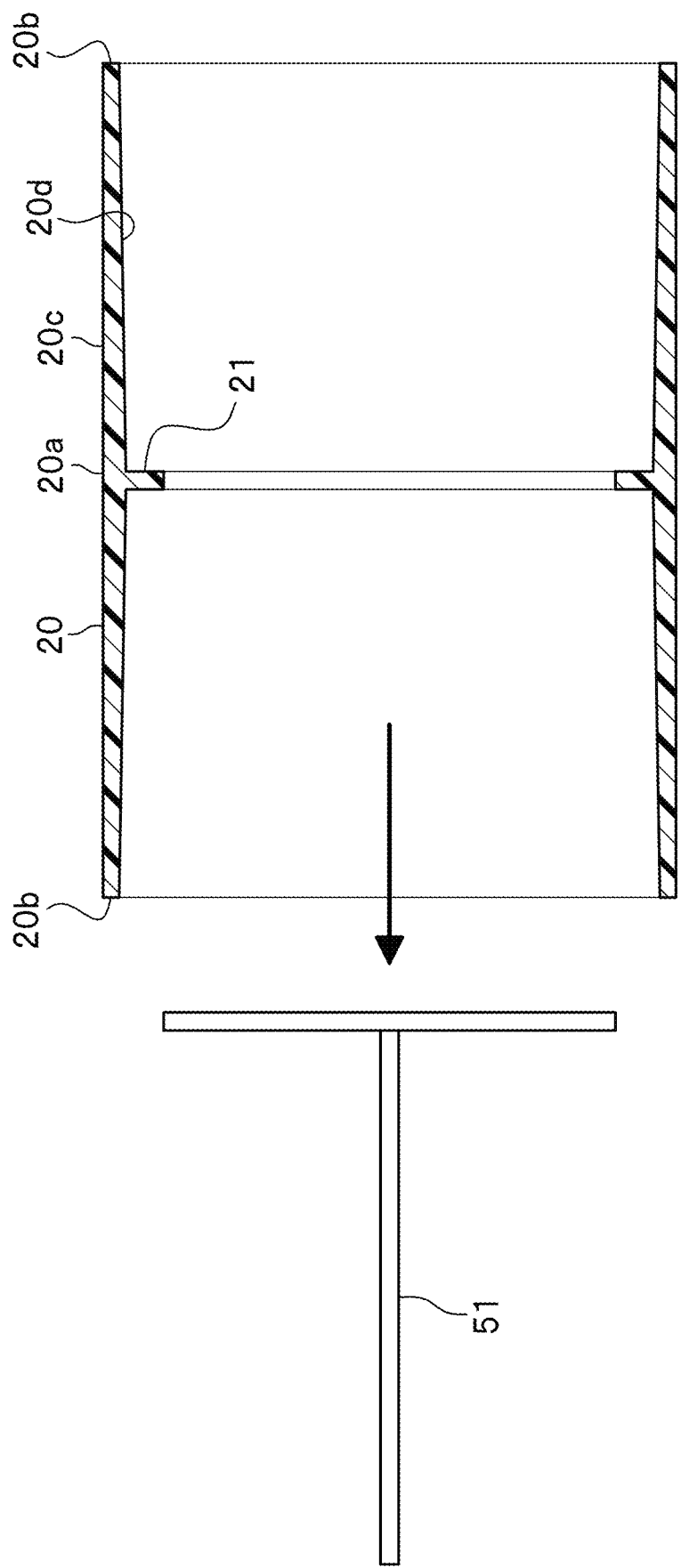
FIG. 4 is a cross-sectional side view of another scene in the molding step of the method for manufacturing the pressure vessel liner according to the present embodiment, to cut off an unnecessary portion.

First, in the step of molding the second liner member 20, molten resin is injected through the straight section 23a of the gate 23, as indicated by an arrow in FIG. 3. This causes the molten resin to be filled into the disk section 23b, the center of the cavity 22, and both ends of the cavity 22 in this order. The second-liner-member molding die 40 is demolded and a molded product is taken out, after the product has been cooled for a predetermined time. Lastly, an unnecessary portion 51 is cut off from the molded product, to finish the second liner member 20, as shown in FIG. 4. The unnecessary portion 51 is T-shaped in cross section. In the cutting step, a radially outer end of the product molded from the disk section 23b is kept and the rest of the same is circularly cut off. This forms the reinforcing rib 21. The second liner member 20 has an outer peripheral surface 20c thereof formed to have a constant outer diameter in the axial direction thereof. The second liner member 20 has an inner peripheral surface 20d thereof formed to have an inner diameter gradually increasing from the midsection 20a toward both ends 20b.

In the joining step, the first liner members 10 are joined with the second liner member 20. A way of joining is not particularly limited, but welding (vibration welding) is used in the present embodiment for the joining. In this manner, the ends of the first liner members 10 and the ends of the second liner member 20 are joined with each other circumferentially at the joint sections A. This completes the pressure vessel liner 1.

Note that the method for manufacturing the pressure vessel liner is not limited to the method described above. For example, injection molding has been used in the molding step, but another molding such as rotational molding and blow molding may be used.

Advantageous Effects

Figure 5:
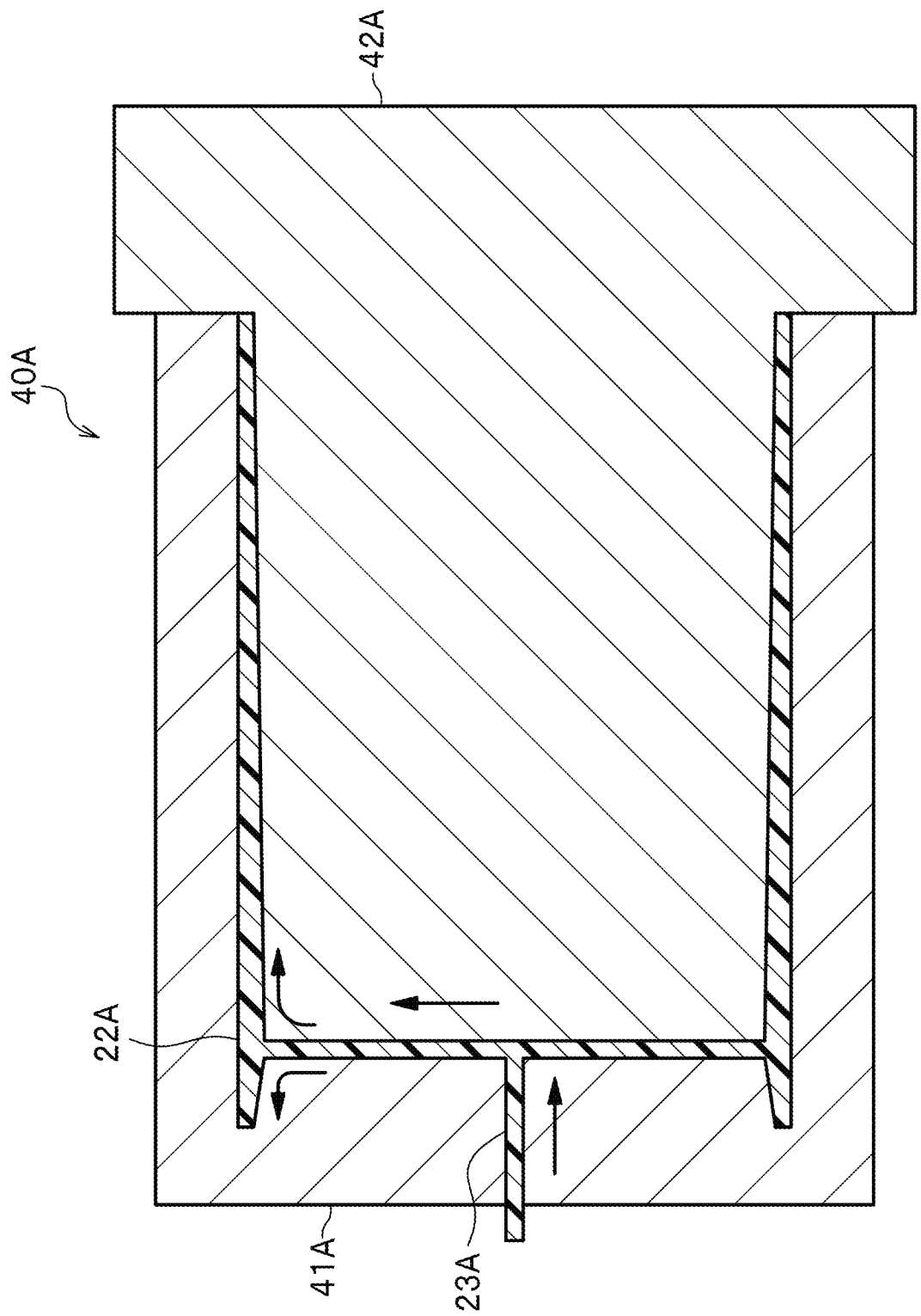
FIG. 5 is a cross-sectional side view of a scene in a molding step to mold a conventional second liner member.

Here, a description is given of a method for forming a second liner member, in a bottomless cylindrical shape, of a conventional pressure vessel liner. As shown in FIG. 5, a conventional molding method has been using a second-liner-member molding die 40A including a first molding die 41A, as a concave die, and a second molding die 42A as a convex die. The second-liner-member molding die 40A has a gate 23A, through which molten resin is injected, provided off-center toward one end of the cavity 22A. Accordingly, it is difficult to keep holding pressure in injection molding even at one end in the axial direction of the cavity 22A, away from the gate 23A, and the other end closer to the gate 23A, to have a problem that a plate thickness of the second liner member at one end is different from that at the other end. As a result, a pressure vessel liner may have a difference or differences in surface level at one or more sections on a surface thereof, when the second liner member is joined with the first liner members, to have strength thereof decreased.

In this respect, according to the above-described pressure vessel liner 1 of the present embodiment, the second liner member 20 has the wall thickness thereof gradually decreasing from the midsection 20a toward both ends in the axial direction thereof, to allow for uniforming holding pressure in injection molding at said both ends, so that the second liner member 20 has its molding accuracy improved at said both ends. This allows for eliminating or reducing a difference in surface level (difference in diameter) at the joint sections A between the first liner members 10 and the second liner member 20, so that stress concentration is avoided at the joint sections A, to have increased strength of the pressure vessel liner.

In addition, the second liner member 20 has the inner peripheral surface inclined and the wall thickness gradually decreasing, from the midsection 20a toward both ends in the axial direction thereof (i.e., has a draft angle), and this facilitates taking out a molded product, when released from the second-liner-member molding die 40, to help molding accuracy improved. Further, the second liner member 20 has the reinforcing rib 21 on the inner peripheral surface circumferentially at the midsection, and this increases the pressure vessel liner 1 in strength, to prevent buckling.

Still further, the reinforcing rib 21 is in a ring shape and is evenly provided in a circumferential direction of the second liner member 20, to avoid stress concentration to reinforce the second liner member 20 in a well-balanced manner.

Still further, the method for manufacturing the pressure vessel liner according to the present embodiment allows for utilizing the gates 23 to form the reinforcing rib 21. This eliminates a separate step of forming the reinforcing ribs 21, to reduce the number of work steps.

Figure 6:
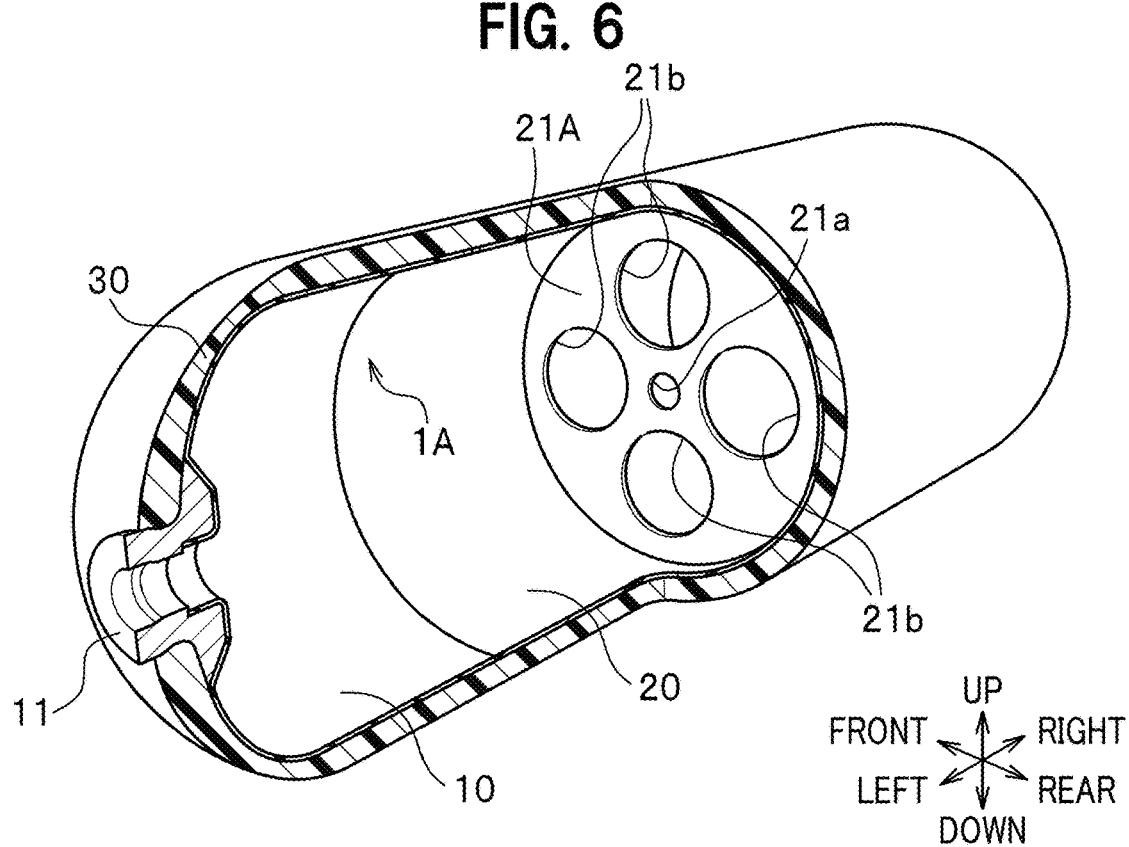
FIG. 6 is a perspective view of a first modification of the second liner member according to the present embodiment.
Figure 7:
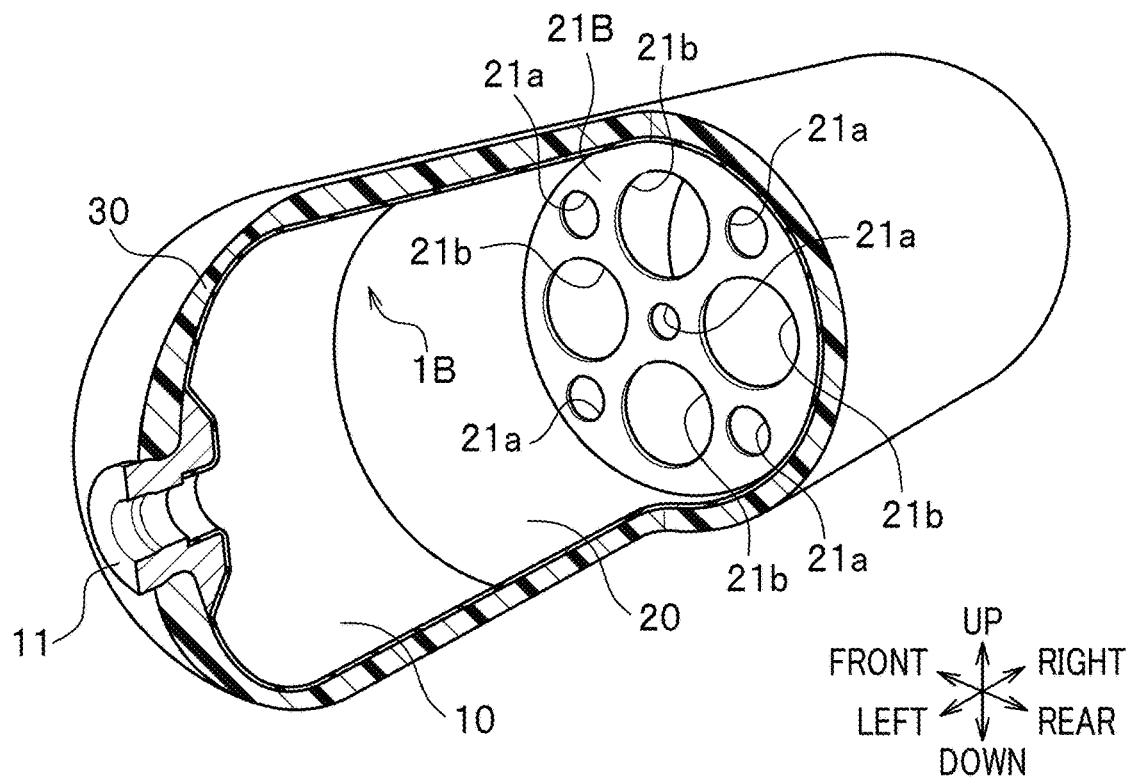
FIG. 7 is a perspective view of a second modification of the second liner member according to the present embodiment.
Figure 8:
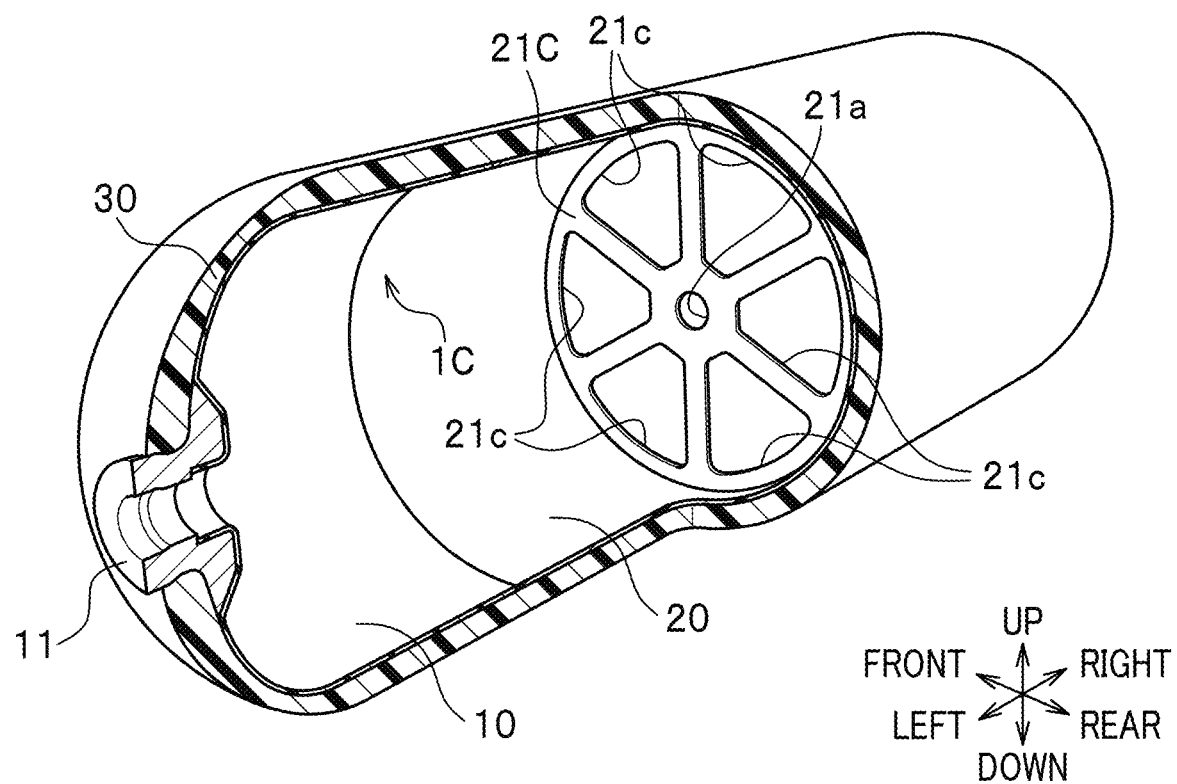
FIG. 8 is a perspective view of a third modification of the second liner member according to the present embodiment.

Hereinbelow, modifications of the reinforcing rib 21 are described. A reinforcing rib 21A according to a first modification has a small circular hole 21a in the center and a plurality of large circular holes 21b on an upper, lower, right, and left sides of the small hole 21a, as shown in FIG. 6. Alternatively, a reinforcing rib 21B according to a second modification has the four regularly provided small circular holes 21a in addition to the first modification in FIG. 6, as shown in FIG. 7. Still alternatively, a reinforcing rib 21C according to a third modification has the small circular hole 21a in the center and a plurality of sector-shaped holes 21c, in identical forms, around the small hole 21a, as shown in FIG. 8.

As described above, the reinforcing rib 21 may be suitably configured in consideration of layout balance and a flow of gas stored inside.

Hereinabove, the embodiment of the present invention has been described, but can be modified as required, within the scope of the present invention. The shape of the reinforcing rib 21 described in the embodiment is merely an example, and the present invention is not limited thereto. For example, the hole in the reinforcing rib 21 may be a square hole or a slit hole, and may not have a small hole in the center.

LEGEND FOR REFERENCE NUMERALS

100: pressure vessel, 1: pressure vessel liner, 10: first liner member, 20: second liner member, 21: reinforcement rib, and 30: reinforcing layer.

The invention claimed is:

1. A pressure vessel liner made of resin and having a pair of first liner members, in a bottomed cylindrical shape, joined with a second liner member in a bottomless cylindrical shape, wherein the second liner member has joint sections, opposing each other, at both ends in an axial direction of the second liner member, and the second liner member is respectively joined to each of the pair of first liner members at the joint sections, and the second liner member includes a midsection, the midsection constituting a middle portion of the second liner member, the second liner member having opposing side portions on opposing sides of the midsection;

the second liner member has a wall with varying wall thickness, the wall thickness of the wall varying, on the opposing sides of the midsection, so as to gradually decrease in thickness from the midsection outward, in an axial direction, toward the respective opposing joint sections, so as to gradually decrease over at least a portion of each side portion on the opposing sides of the midsection.

2. The pressure vessel liner according to claim 1, wherein the second liner member is formed, circumferentially on an inner peripheral surface thereof, with a reinforcing rib at the midsection.

3. The pressure vessel liner according to claim 2, wherein the reinforcing rib is in a ring shape.

4. A method for manufacturing a pressure vessel liner, the method comprising:

a molding step of molding a pair of first liner members, in a bottomed cylindrical shape, and a second liner member in a bottomless cylindrical shape, the second liner member having opposing ends and a center, with opposing side portions on opposing sides of the center; and a joining step of joining, respectively, the pair of first liner members with the second liner member at the opposing ends, of the second liner member, in an axial direction of the second liner member, wherein the second liner member is molded in the molding step, with a resin injected such that a wall thickness of the second liner member gradually decreases from the center outwardly, in an axial direction of a cavity in a molding die toward the respective opposing ends of the second liner member, such that the wall thickness gradually decreases over a least a portion of each side portion;

wherein the cavity has a distance between walls gradually decreasing from the center toward the opposing ends of the second liner member, and the cavity communicates with a gate, through which the resin is injected, at the center.

* * * * *